United States Patent [19]

Takayama et al.

[11] 3,972,382
[45] Aug. 3, 1976

[54] HYDRAULIC BRAKE SYSTEM WITH AUTOMATIC BRAKE MEANS FOR VEHICLES

[75] Inventors: Katsuki Takayama, Chirya; Yoshiharu Adachi, Toyota, both of Japan

[73] Assignee: Aisin Seiki Kabushiki Kaisha, Toyota, Japan

[22] Filed: Apr. 14, 1975

[21] Appl. No.: 567,855

[30] Foreign Application Priority Data

May 24, 1974 Japan................................. 49-59155

[52] U.S. Cl................................. 180/98; 188/181 A; 303/10; 303/21 A; 303/21 F
[51] Int. Cl.² ....................... B60K 28/00; B60T 7/12
[58] Field of Search.................. 303/21 F, 2, 3, 13, 303/10, 20, 21 R, 21 A; 188/181 A, 181 R; 180/82 R, 98, 92, 94; 60/581

[56] References Cited

UNITED STATES PATENTS

| | | | |
|---|---|---|---|
| 3,617,099 | 11/1971 | Sugiyama | 303/21 F X |
| 3,749,197 | 7/1973 | Deutsch | 180/98 |
| 3,795,426 | 3/1974 | Sisson | 303/21 F |
| 3,825,306 | 7/1974 | Fink | 303/21 F X |
| 3,850,480 | 11/1974 | Atkins | 188/181 A |

*Primary Examiner*—Trygve M. Blix
*Assistant Examiner*—Douglas C. Butler
*Attorney, Agent, or Firm*—Pierce, Scheffler & Parker

[57] ABSTRACT

A hydraulic brake system for an automobile comprises an automatic brake valve disposed in a fluid passage between a pump and a reservoir. The automatic brake valve is actuated by an obstacle-sensing computer to increase the fluid pressure in the fluid passage irrespective of foot brake pedal depression. Therefore, the brake may be applied even when the automobile driver should be unaware of an obstacle on the road.

7 Claims, 4 Drawing Figures

HYDRAULIC BRAKE SYSTEM WITH AUTOMATIC BRAKE MEANS FOR VEHICLES

BACKGROUND OF THE INVENTION

This invention relates to a hydraulic brake system for vehicles, and more particularly to a hydraulic brake apparatus with automatic braking means which is actuated to apply brakes according to an electric signal irrespective of a foot brake pedal operation.

There has been proposed an automatic brake system which comprises a radar device for detecting an obstacle in the course of the vehicle and generating an output signal, a computer for generating an electrical warning signal in accordance with the output signal, and electric motor means including solenoid coil assembly to be actuated by the electric warning signal thereby applying brakes. Such automatic brake system is very useful in safety of the vehicle because the brake may be applied not only by the foot pedal depression but also by the electrical automatic means even if the vehicle driver should be unaware of the obstacle on the road.

In one of the conventional automatic brake systems the foot brake pedal of vehicle is adapted to operate according to energization of the electric motor means. This system is undesirable since a large size of electric motor means is required thereby resulting in high cost. In another conventional brake system there is provided a hydraulic actuator which is actuated by energization of the electric motor means thereby depressing the foot brake pedal. This system is also undesirable because of requirement of the hydraulic actuator which requires additional space and pipes of the vehicle brake system.

SUMMARY OF THE INVENTION

It is therefore one of the objects of this invention to provide a hydraulic brake system with automatic braking means which may overcome the conventional drawbacks as above mentioned.

It is another object of this invention to provide a hydraulic brake system with automatic braking means wherein only electric motor means is required to achieve the automatic braking.

It is a further object of this invention to provide a hydraulic brake system with automatic brake means which is simple in construction and inexpensive in manufacture.

BRIEF DESCRIPTION OF THE DRAWINGS

Various other objects, features and attendant advantages of this invention will be more fully appreciated as the same becomes better understood from the following detailed description when considered in connection with the accompanying drawings wherein.

DETAILED EXPLANATION OF THE PREFERRED EMBODIMENTS

Figure 1:
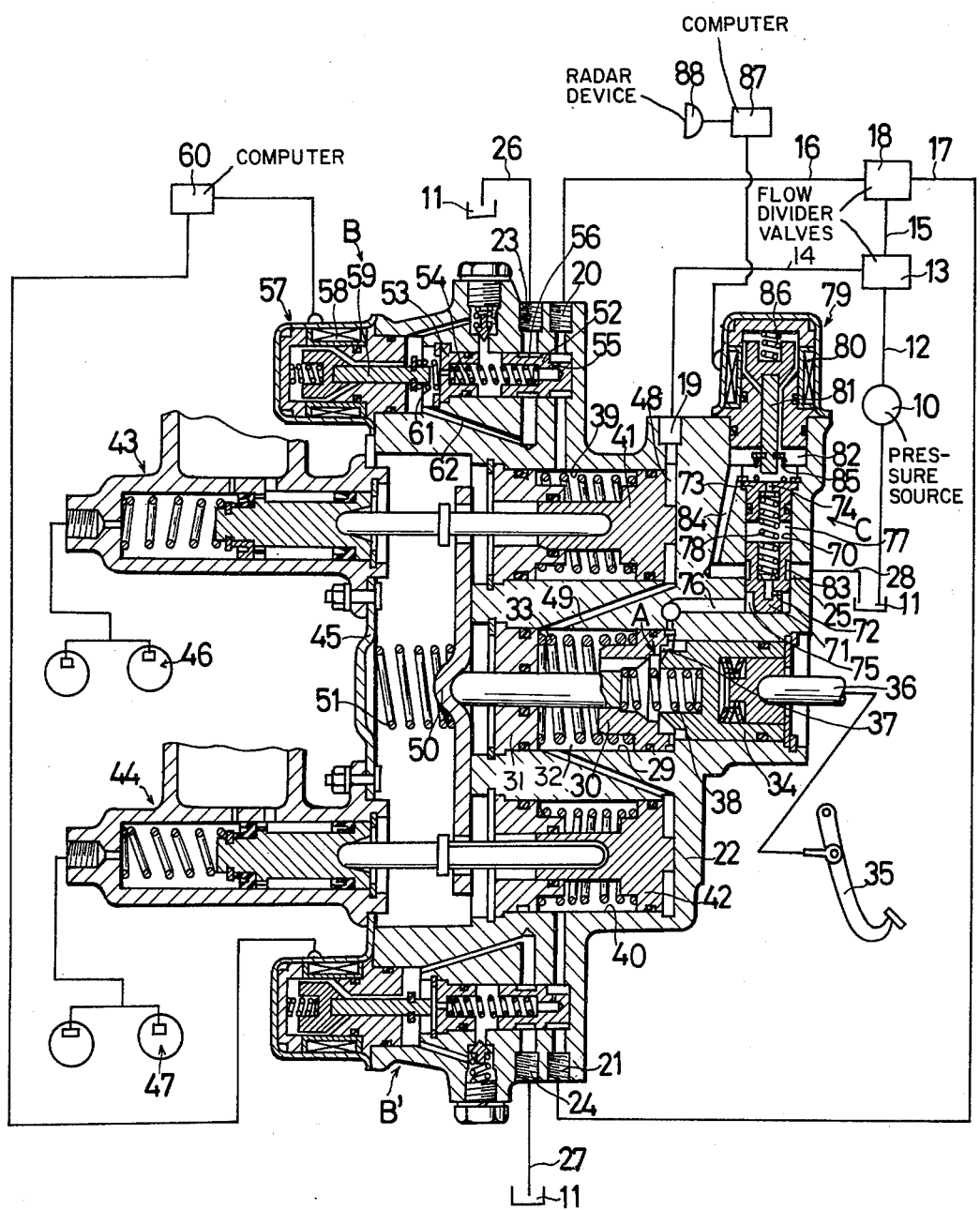
FIG. 1 is a diagrammatic illustration of one embodiment of a hydraulic brake system in accordance with the present invention.

Referring now to the drawings, especially FIG. 1 thereof wherein a first embodiment of the invention is illustrated, a vehicle brake system comprises a fluid supply source 10 which may be a hydraulic pump driven by a vehicle engine (not shown). The fluid supply source 10 draws hydraulic fluid from a reservoir 11 and supplies the fluid under pressure through a pipe 12 to a flow divider valve 13. The valve 13 may be of a known construction and divides the fluid flow from the pipe 12 into two pipes 14 and 15 at a predetermined ratio irrespective of the pressure therein. The fluid pipe 15 is further divided into two pipes 16 and 17 at another flow divider valve 18 which has the same construction as the valve 13. The pipes 14, 16 and 17 are fluidically connected to ports 19, 20 and 21 of brake booster housing 22, respectively. The brake booster housing 22 further includes ports 23, 24 and 25 which are fluidically connected to pipes 26, 27 and 28, respectively, each pipe being in turn connected to the reservoir 11.

The housing 22 comprises a stepped bore 29 in which a plunger piston 30 is slidably fitted and a hollowed plug 31 is fixed to thereby constitute a chamber 32. A coiled spring 33 is interposed between the piston 30 and the plug 31 thereby urging the piston 30 to move in a rested position as shown.

Within the stepped bore 29 is slidably fitted a valve piston 34 which is mechanically connected to a brake pedal 35 through a push rod 36.

Between the plunger piston 30 and the valve piston 34 is mounted a spring 38 so as to urge the valve piston 34 in the rested position as shown, the force of spring 38 being weaker than that of spring 33. Therefore, a normally opened valve A is formed between the rear end of plunger piston 30 and the forward end of valve piston 34. When the valve A is closed, a chamber 37 is constituted between the plunger piston 30 and the valve piston 34, said chamber 37 being fluidically independent of the chamber 32 at this time.

A pair of bores 39 and 40 are provided in the housing 22 in axially parallel relationship with the central bore 29. A pair of power pistons 41 and 42 are slidably fitted within the bores 39 and 40 to mechanically connect with brake master cylinders 43 and 44, respectively. The master cylinders 43 and 44 are fixed to a plate 45 which is in turn fixed to the housing 22 and are fluidically connected to wheel brakes 46 and 47, respectively.

A fluid chamber 48 is provided in the housing 22 at the rear of power piston 41 and the pressurized fluid from the pipe 14 is supplied to the chamber 48 through the port 19, then to the central chamber 32 through a passage 49.

A lever member 50 is mounted to normally abut against the plunger piston 30 by a compression spring 51 which is disposed between the plate 45 and the lever member 50. In case of hydraulic failure of the pump 10, the lever 50 will be moved forwardly by the plunger piston 30 to thereby actuate each master cylinder through each power piston.

The hydraulic brake housing 22 also comprises a pair of anti-lock control valves generally indicated by references B and B'. A fluid flow control valve 52 is slidably mounted in the anti-lock control valve B. A stationary member 53 of central aperture is mounted in the control valve B coaxially with the slidable valve 52. A spring 54 is disposed between the stationary member 53 and the slidable valve 52 for urging the latter in the illustrated position. The valve 52 is provided with a fixed orifice 55 and an annular groove 56.

An electric motor 57 comprises a solenoid 58 and a movable plunger 59 to be actuated thereby. The motor 57 is electrically connected to a computer 60 which is adapted to give an output signal in accordance with the wheel rotational speed. A spring 61 is interposed between the movable plunger 59 and the stationary member 53 to keep the plunger 59 away from the member 53 when the solenoid 58 is deenergized. Therefore, left and right chambers at each side of stationary member 53 are fluidically communicated with each other and the left chamber is communicated with the pipe 26 through passage 62 and port 23. When the valve 52 is moved left against the spring 54 due to the pressurized fluid supplied through port 20, the fluid communication may be established between the ports 20 and 23. Therefore, a substantially constant flow of pressurized fluid is admitted from the port 20 through orifice 55 into the right chamber in which the spring 54 is mounted.

When the solenoid 58 is energized to move the plunger 59 in the right direction, the fluid flow from the right chamber to the left chamber through the central aperture of stationary member 53 is limited to thereby increase the hydraulic pressure in the right chamber. It is to be noted that the fluid pressure at the port 20 is greater than the fluid pressure in the right chamber by a predetermined value. The fluid pressure at the port 20 is, thus, increased in proportion to the increase of fluid pressure in the right chamber. It is to be further noted that the pressure increase at the port 20 is caused by the fluid in the pipe 16 and is independent of pressure increase at the pipe 14.

The construction and operation of the anti-lock control valve B' are substantially the same as the control valve B and will be understood without description thereof.

The feature of this invention resides mainly in provision of an automatic actuating valve assembly generally indicated by reference C.

The housing 22 comprises a bore 70 in which a flow control piston 71 provided with a fixed orifice 72 is slidably fitted and a stationary member 73 provided with a central aperture 74 is mounted coaxially with the control piston 71. The control piston 71 defines at its rear end a lower chamber 75 which is fluidically communicated both with the chamber 37 through a passage 76. The control piston 71 and the stationary member 73 constitute an intermediate chamber 77 in which a coil spring 78 is disposed for urging the control piston 71 toward the lower chamber 75.

The automatic actuating valve assembly C further includes an electric motor 79 fixed to the housing 22 and comprising a solenoid coil assembly 80 and a movable plunger 81. An upper chamber 82 is constituted between the electric motor 79 and the stationary member 73 and is fluidically communicated with an annular groove 83 provided on the control piston 71 via passage 84 and then with the port 83. The movable plunger 81 is urged to move upwardly by a spring 85 interposed between the plunger 81 and the stationary member 73 against a spring 86 interposed between the plunger 81 and the upper end wall of motor assembly 79. Therefore, the central aperture 74 of stationary member 73 is opened off the lowest end of plunger 81 to thereby cause the fluid communication between the intermediate chamber 77 and the upper chamber 82.

When the pressure difference between the lower chamber 75 and the intermediate chamber 77 gets a predetermined value, the control piston 71 will be moved up against the biasing force of spring 78 for thereby allowing fluid communication between the lower chamber 75 and the port 83. Such fluid communication is through variable orifice due to movement of the control piston 71. Thus, the quantity of fluid admitted to the intermediate chamber 77 from the lower chamber 75 via fixed orifice hole 72 is kept constant. As a result, the fluid admitted to the chamber 75 from the annular chamber 37 through passage 76 is returned back to the reservoir 11 through the fixed orifice 72, intermediate chamber 77, upper chamber 82, passage 84, annular groove 83 and the port 25 at its one part and through the variable orifice and port 25 at its other part.

When the plunger 81 is located in the illustrated position wherein the plunger 81 is apart off the central aperture 74 of stationary member 73 due to the spring 85, substantially no pressure difference is existed between the intermediate chamber 77 and the upper chamber 82 since the aperture 74 is greater than the orifice hole 72. When the plunger 81 is moved down toward the aperture 74 due to energization of solenoid assembly 80, the fluid flow admitted to the upper chamber 82 is restricted to thereby increase the fluid pressure in the intermediate chamber 77. It is to be noted that the downward movement of plunger 81 is dependent on the flow quantity of electric current on the solenoid coil 80. The fluid pressure in the intermediate chamber 77 is increased as the force for moving down the plunger 81 is increased. It is to be further noted that the fluid pressure in the lower chamber 75 is increased as the fluid pressure in the intermediate chamber 77 is increased since the fluid pressure in the lower chamber 75 is higher than the fluid pressure in the intermediate chamber 77 by a predetermined value.

The solenoid coil assembly 80 is electrically connected to a computer 87 of well-known type which is in turn connected to a radar device 88 provided on the vehicle for sensing an obstacle and generating an output signal. The output signal thus generated is changed to an electric signal at the computer 87 to energize the solenoid coil 80 of motor assembly 79.

In operation, when the brake foot pedal 35 is depressed to push the rod 36 forwardly, the valve piston 34 will be moved to the left against the biasing force of spring 38 to thereby restrict the fluid communication between the chambers 32 and 37. Therefore, the fluid pressure in the chambers 32 and 48 is increased to urge the power piston 41 to move in the left direction. The brake master cylinder 43 is thus actuated to increase the fluid pressure in the brake wheel cylinder 46. It will be understood that the brake master cylinder 44 is also actuated to increase the fluid pressure in the brake wheel cylinder 47 by the movement of power piston 42.

The pressure increase in the chamber 48 causes the pressure increase in the pipe 14 but the fluid pressure in the pipe 15 is not changed due to the well-known function of flow divider 13. The leftward movement of power piston 41 causes the fluid in the bore 39 to flow toward the anti-lock control valve B so that the valve piston 52 is moved to the left to thereby admit the increased fluid in the bore 39 to the port 23 via variable orifice on the piston 52. Hence, the fluid pressure in the bore 39 is kept at a small predetermined value even when the power piston 41 is moved to the left.

When the depressing force on the pedal 35 is released, the valve piston 34 is moved off the plunger piston 30 by the spring 38 thereby permitting the fluid to freely flow from the chamber 32 to the chamber 37. Thus the fluid pressure in the chambers 32 and 48 is decreased to the fluid pressure in the chamber 37, that is to say, no fluid pressure is existed in the chambers 32 and 48. The power piston 41 is returned to its rested position as shown thereby releasing the pressure generating action of master brake cylinder 43.

In the event that the vehicle driver misses an obstacle on the route of the vehicle, for instance, the distance between the leading vehicle and the vehicle equipped with the brake booster of this invention is decreased below a predetermined value, the radar device 88 senses such a dangerous condition and the computer 87 generates the electric output signal. The solenoid coil assembly 80 of automatic actuating valve C is thus energized to urge the plunger 81 to move toward the central aperture 74 of stationary member 73. The fluid flow from the intermediate chamber 77 to the upper chamber 82 is thus restricted to thereby increase the fluid pressure in the chamber 77. Therefore, the fluid pressure in the lower chamber 75 which has been set a little greater than the fluid pressure in the intermediate chamber 77 due to orifice action of the piston 71 is also increased to thereby increase the fluid pressure in the chambers 37, 32 and 48. The pressure increase in the chamber 48 causes the power piston 41 to move in the left direction thereby actuating the master cylinder 43. It will be apparent that the master cylinder 44 is similarly actuated by the power piston 42.

Then, the anti-lock operation of brake booster will be explained although such an operation of anti-lock valves B and B' is not necessarily essential in this invention.

When the lock or skid of at least one of the wheels is sensed by the computer 60 during the brake application, for instance, the wheel provided with wheel brakes 46 is locked during the brake application either by the foot pedal depression or by the actuation of automatic control valve C, the solenoid coil 58 of the motor assembly 57 is energized to thereby move the plunger 59 in the direction wherein the plunger 59 closes the central aperture of stationary member 53. Therefore, the fluid pressure at the port 20 is increased due to the same reason as explained about the automatic control valve C, and so the pressure in the bore 39 is also increased thereby counteracting the pressure in the chamber 48. The force of power piston 41 for actuating the master cylinder 43 is thus decreased irrespectively of the fluid pressure in the chamber 48. Accordingly, the pressure at the wheel brake cylinder 46 is decreased to release the lock of wheels.

Now, if the pump 10 should be hydraulically failed, no fluid pressure is increased in the chamber 32 even upon the movement of valve piston 34 before the valve piston 34 engages the plunger piston 30. But, a further forward movement of valve piston 34 permits a mechanical engagement thereof with the plunger piston 30. The lever 50 is thus moved forwardly against the spring 51 by the depressing force transmitted to the plunger piston 30. The master cylinders 43 and 44 are thus actuated.

Figure 2:
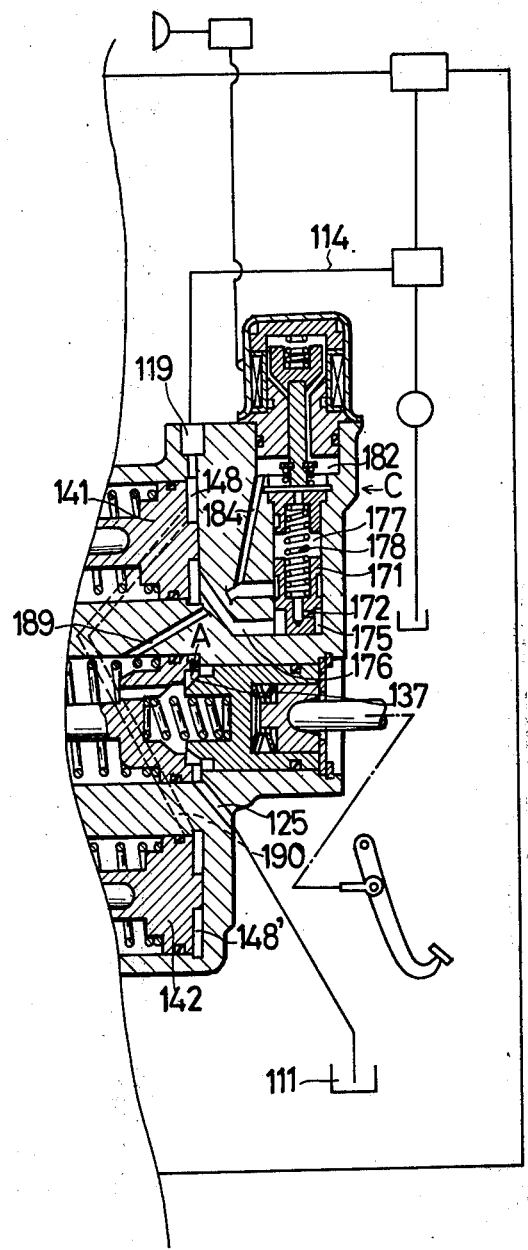
FIG. 2 is a diagrammatic illustration of a main part of a modified embodiment in accordance with the present invention.

Referring then to FIG. 2 wherein a second embodiment of this invention is illustrated, the automatic actuating control valve C is actuated in advance of the valve A whereas the valve A of the first embodiment is actuated in advance of the automatic actuating control valve C as explained. More specifically, the fluid supplied to a port 119 from a pipe 114 is admitted to a bottom chamber 175 of automatic actuating valve C via a chamber 148 and a passage 176. The major part of fluid supplied at the chamber 175 urges a piston 171 to move up against a coiled spring 178 and is then admitted to a chamber 132 via a passage 189, whilst the minor part of fluid in the chamber 175 is admitted to the chamber 132 via a fixed orifice 172 on the piston 171, an intermediate chamber 177, an upper chamber 182, and a passage 184. The fluid thus admitted to the chamber 132 is then returned to a reservoir 111 through a valve A, an annular chamber 137, and a port 125. A fluid chamber 148' for a second power piston 142 is fluidically communicated with the fluid chamber 148 for a first power piston 141 through a passage 190 whereby the actuation of the automatic control valve B may effect the pressure increase of the chamber 132.

The other construction and operation of the second embodiment are substantially the same as those of the first embodiment and would be apparent to a skilled in the art, therefore the detailed explanation thereof may be omitted.

Figures 3, 4:
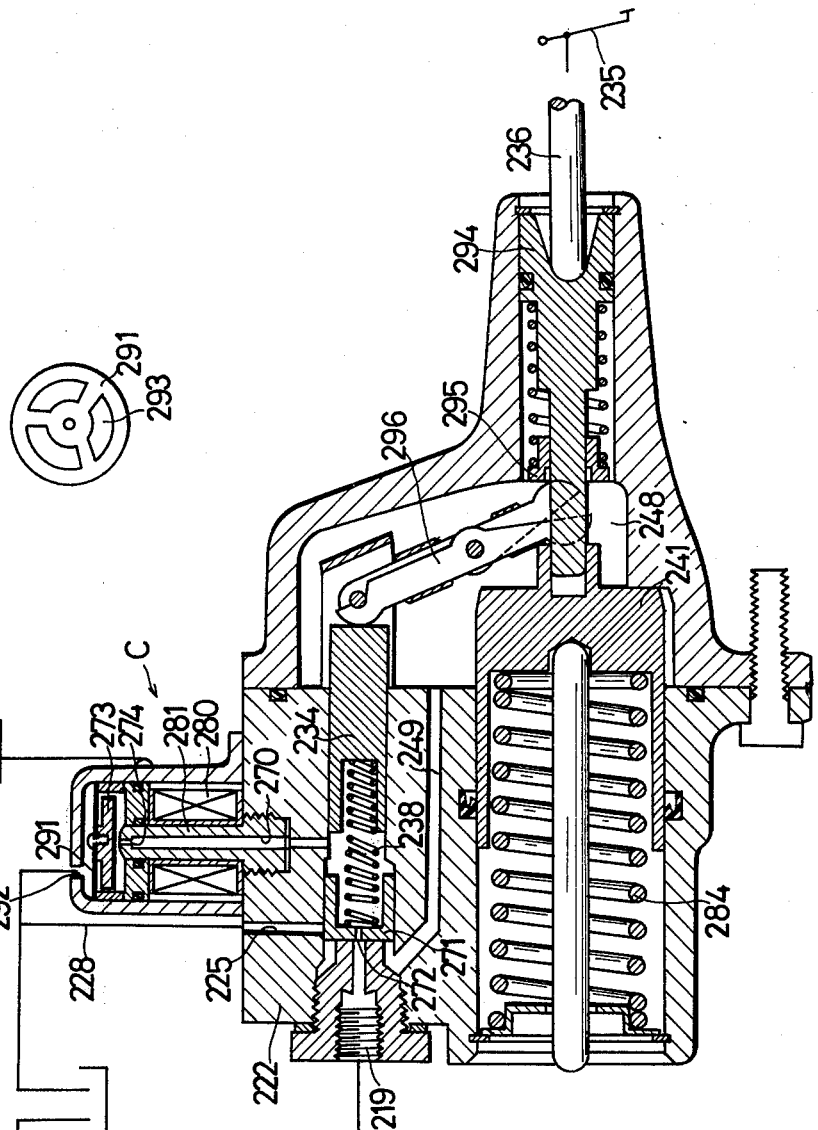
FIG. 3 is a diagrammatic illustration of another modification of a hydraulic brake system in accordance with the present invention.
FIG. 4 is a plan view of a plate member used in the hydraulic brake system of FIG. 3.

In FIG. 3, a third embodiment of this invention is shown. When a pump 210 is driven by a vehicle engine (not shown), the fluid pressure therefrom is supplied through a pipe 214 to a port 219 of hydraulic booster assembly thereby urging movable piston 271 to move to the right against a compression spring 238. The major part of fluid pressure is returned to a reservoir 211 through a port 225 of housing 222 and a pipe 228, while the remaining part thereof is returned to the reservoir 211 through automatic brake actuating valve C. The automatic brake actuating valve C comprises a stationary plunger 281 fixed to the housing 222, a solenoid coil assembly 280 electrically connected to a computer 287 which is in turn connected to a radar device 288, and a movable member 273 which is secured to an annular resilient plate 291. The stationary plunger 281 is provided with an inner axial passage 282 and an orifice opening 274 facing the movable member 273. Therefore, the fluid admitted to a fixed orifice 272 of the movable piston 271 is supplied to the inner axial passage 282 of plunger 281 and the orifice opening 274, then to an outlet port 292 through slots 293 of the resilient plate 291.

When a brake pedal 235 is depressed to move a push rod 236, a piston 294 slidably fitted within the housing 222 is moved to the left. An annular member 295 fixed to the piston 294 is thus moved thereby rotating lever means 296 pivoted on the housing 222 in the direction wherein the lever means 296 urges a valve piston 234 to move to the left against a spring 238. The leftward movement of the valve piston 234 restricts the fluid flow from the fixed orifice 272 to the inner axial passage 270 of plunger 281 to thereby increase the fluid pressure. The thus increased pressure is admitted to a power chamber 248 via passage 249. A power piston 241 is therefore moved to the left against a coil spring 284 thereby actuating a master cylinder (not shown).

In the event that the computer 287 generates an output signal to apply the brake irrespective of depression of the foot brake pedal 235, the solenoid coil assembly 280 of automatic actuating valve C is energized to pull down the movable member 273. The movable member 273 is thus approached to the orifice opening 274 of plunger 281 due to the resilient flexibility of plate 291. The downward movement of the member 273 is proportional to the electric current flow on the solenoid coil assembly 280. Accordingly, the fluid flow through orifice opening 274 is restricted to increase the power chamber 248. The power piston 241 is thus moved to actuate the master brake cylinder independently of operation of the foot brake pedal.

Although the disclosed embodiments include a radar for detecting an obstacle in the course of vehicle, it is to be noted that the present invention is also applicable to the vehicle having no radar. For example, when it is necessary to detect the brake fluid failure without foot pedal depression, the present invention will satisfy such necessity by connecting the computer to an electrical sensing device for detecting brake fluid failure.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a hydraulic brake system for vehicles with means for automatically applying brakes in response to a signal and including a brake foot pedal, master cylinder means, wheel cylinder means, a computer for generating an electrical output signal, a fluid pressure source, a reservoir, a fluid passage fluidically connecting said fluid pressure source to said reservoir, a valve piston disposed in said fluid passage and movable to restrict said fluid passage in response to movement of said brake foot pedal, power piston means operatively connected to said master cylinder means, and power chamber means fluidically communicated with said fluid passage, hydraulic pressure in said power chamber means being increased due to restriction of said fluid passage thereby urging said power piston means to move in a direction wherein hydraulic pressure in said master cylinder means is increased; the improvement comprising an automatic brake valve means disposed in said fluid passage and electrically connected to said computer, said automatic brake valve means being actuated by said electrical output signal to restrict said fluid passage whereby hydraulic pressure in said power chamber means is increased so as to move said power piston means in the said direction.

2. A hydraulic brake system as set forth in claim 1, wherein said automatic brake valve means comprises an electric motor including a solenoid coil assembly to be energized by said electric output signal of said computer.

3. A hydraulic brake system as set forth in claim 2, wherein said automatic brake valve means further comprises a movable piston disposed in said fluid passage and provided with a fixed orifice, a stationary member coaxial to said movable piston and provided with an orifice opening, a spring interposed between said movable piston and said stationary member, and a plunger movable in the direction wherein fluid flow through said orifice opening of said stationary member is restricted by said plunger in accordance with energization of said solenoid coil assembly.

4. A hydraulic brake system as set forth in claim 3, wherein said movable piston is disposed between said valve piston and said reservoir.

5. A hydraulic brake system as set forth in claim 3, wherein said movable piston is disposed between said fluid pressure source and said valve piston.

6. A hydraulic brake system as set forth in claim 2, wherein said automatic brake valve means further comprises a movable piston disposed in said fluid passage and provided with a fixed orifice, said valve piston being disposed coaxially to said movable piston, a spring interposed between said movable piston and said valve piston, a fixed plunger provided with an internal fluid passage and an orifice opening, and a plate member movable in the direction wherein fluid flow through said orifice opening of said fixed plunger is restricted in accordance with energization of said solenoid coil assembly.

7. A hydraulic brake system as set forth in claim 2, wherein said automatic brake valve means further comprises a radar device for detecting an obstacle in the course of the vehicle, said computer being electrically connected to said radar device.

* * * * *